Patented Apr. 12, 1938

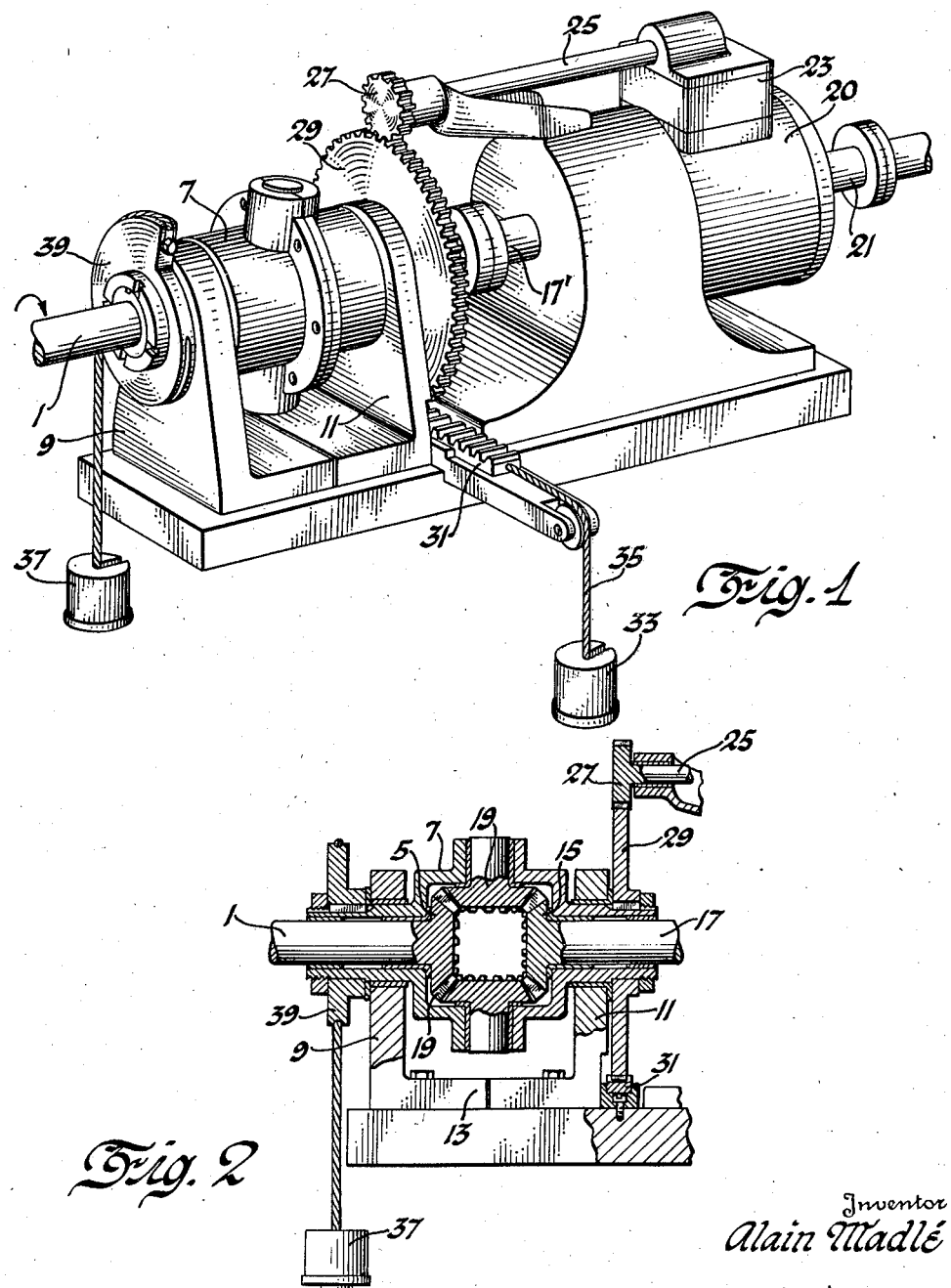

2,113,624

UNITED STATES PATENT OFFICE 2,113,624

POWER TRANSMISSION CONTROL

Alain Madlé, Bristol, Conn., assignor to General Motors Corporation, Detroit, Mich., a corporation of Delaware Application February 1, 1937, Serial No. 123,365

4 Claims. (Cl. 74—259)

This invention relates to power transmission and is intended more particularly for industrial uses in controlling mechanism operating at variable speeds from a constant speed source, the output speed being automatically varied to accommodate load changes. It has utility when used for driving machines for winding strip, wire, fabric or paper functioning to automatically maintain a constant tension in the material being wound or coiled.

The control shown is intended for use where there is employed a constant speed input shaft and more particularly where the constant input speed is not obtained from an individual motor to drive the change speed device, in which latter case electrical or mechanical control could be obtained from the motor.

The device is intended for use with machines where material is being wound upon a drum or the like and where, incorporated in such machines, there is provision to feed the material at a constant linear velocity to the drum. It will be obvious that as the radial thickness of the material on the drum increases, the drum should be rotated more slowly in order to wind thereon given lengths in a given time. In other words, a given rate of feed of material requires changes in the rate of rotation of the winding drum to insure constant tension. It may be otherwise expressed by saying that the power necessary for the winding is a product of the tension and the linear velocity. If the latter is constant there must be a constant power flow to the drum to maintain constant tension. Since the input speed is constant, the constant power is provided by the mechanism of this invention whereby the rotation of the output shaft is automatically reduced as the load increases due to equal lengths of material being wound at radially greater distances.

The invention will be understood by referring to the accompanying drawing which is somewhat diagrammatic in character. In the drawing:

Fig. 1 is a perspective of the mechanism.

Fig. 2 is a view in elevation with parts broken away and in section.

Referring by reference characters to the drawing, numeral 1 may be the power driven input shaft, its direction of rotation being that of the arrow on Fig. 1. The shaft 1 terminates in a bevel gear 5. The shaft is journaled within end bearings of a reaction member taking the form of a differential cage, the reaction member 7 being rotatably supported by the arms 9 and 11 of a cradle 13. Opposed to gear 5 is a second bevel gear 15 on a shaft 17 also journaled in the reaction member 7. The member 7 is equipped with bevel pinions 19 meshing with bevel gears 5 and 15. The shaft 17 may be integral with or connected to the input shaft 17' of a ratio changing unit designated by numeral 20. The unit 20 preferably performs its function through the use of an input toroidal race on shaft 17' and an output race on shaft 21. Between the races are rollers adapted to be adjusted relative to the races in a well known way to effect ratio changes. The races and rollers are not shown since they are not per se a part of the invention. A control box 23 contains structure not shown to shift the rollers and therefore change the ratio of input and output speeds. The control mechanism within box 23 is not a part of the invention and is not illustrated. It may be that of my application S. N. 695,145. It is actuated by a rotatable shaft 25 extending from the box 23 and equipped with a pinion 27 at its end. This shaft is to be rotated automatically in response to load and for that purpose its pinion 27 engages a gear wheel 29 on the end of the reaction member 7 whereby rotation of the member 7 operates to change the ratio between the input and output shafts of the ratio changing mechanism.

A metering torque is imposed on the reaction member. For that purpose a rack 31 is slidably mounted and its teeth engage the gear wheel 29. A weight 33 is operably connected to the rack by a cable 35 as shown. Also, a weight 37 is connected to a compensating cam 39 secured on the opposite end of the reaction member.

The direction of rotation of the reaction member 7 as influenced by the weights is such as to tend to shift the ratio in a way to tend to rotate the output shaft at its highest speed and it will do so if no work is being done by the mechanism. The reaction torque from the load counteracts this tendency and tends to shift the ratio toward low output speed. A condition of equilibrium will occur when the metering torque upon the reaction member 7 caused by the weight equals the reaction torque produced by the load. If, while so operating, variations in the load change the reaction torque of the load upon the reaction member, an unbalanced force in the reaction member is produced which causes the reaction member to rotate and change the ratio, and the speed of the output shaft. This rotation and ratio change effects a new balance of forces upon the reaction member. Changing the rates of rotation of the rotating elements constituting the mechanism itself creates a varying torque upon the reaction member, independent of the reaction torque from the load. This is compensated for by the cam 39 and weight 37, the cam being so shaped that the torque of the unloaded mechanism is balanced for all speeds, it being understood that the load impressed torque is balanced by the metering torque transmitted to the reaction member by the weight 33 and rack 31.

By the mechanism described a constant speed input shaft may drive an output shaft at variable speeds, dependent upon variations in load and the changes in speed of the output shaft are made automatically in response to changing load conditions. When used for such purposes as coiling strips or wire a substantially constant tension is ensured upon the material being wound or coiled.

I claim:

1. In combination, a constant speed input shaft, an output shaft, change speed mechanism including a control to vary the speed of the output shaft, said mechanism also including a driving shaft, gear elements on said input shaft and driving shaft, a rotary reaction member having other gear elements meshing with the gear elements of the input shaft and driving shaft, connections between said reaction member and the control for the change speed mechanism whereby load changes on the output shaft may operate through the change speed mechanism and upon the reaction member and whereby resulting rotary movements of the latter may operate to change the ratio of the change speed mechanism.

2. The invention defined by claim 1, said connections include a pinion secured to the reaction member and gearing between said pinion and the control for the change speed mechanism.

3. The invention defined by claim 1, said connections include a pinion secured to the reaction member and gearing between said pinion and the control for the change speed mechanism, together with a slidable rack engaged by the pinion of the reaction member and a weight biasing said rack to a movement in one direction.

4. The invention defined by claim 1, said connections include a pinion secured to the reaction member and gearing between said pinion and the control for the change speed mechanism, together with a slidable rack engaged by the pinion of the reaction member and a weight biasing said rack to a movement in one direction, and a weighted compensating cam secured to said reaction member.

ALAIN MADLÉ.